No. 676,307. Patented June 11, 1901.
W. GALECKI.
DEVICE FOR CUTTING TURF.
(Application filed Mar. 28, 1901.)

(No Model.) 2 Sheets—Sheet 1.

No. 676,307. Patented June 11, 1901.
W. GALECKI.
DEVICE FOR CUTTING TURF.
(Application filed Mar. 28, 1901.)
(No Model.) 2 Sheets—Sheet 2.

WITNESSES:

INVENTOR
Wladislaus Galecki
BY Richards Co
ATTORNEYS

UNITED STATES PATENT OFFICE.

WLADISLAUS GALECKI, OF WARSAW, RUSSIA.

DEVICE FOR CUTTING TURF.

SPECIFICATION forming part of Letters Patent No. 676,307, dated June 11, 1901.

Application filed March 28, 1901. Serial No. 53,306. (No model.)

*To all whom it may concern:*

Be it known that I, WLADISLAUS GALECKI, a subject of the Czar of Russia, residing at Warsaw, Kingdom of Poland, Empire of Russia, have invented a certain new and useful Improved Device for Cutting Turf, of which the following is a full, clear, and exact description.

The present invention consists of a device for cutting turf, comprising a substantially vertically movable box having one side formed to a cutter at its lower end and having a slide to close the lower end when the layer of turf has been cut. The said box is further provided with a mixing device inside, by means of which the turf cut is thoroughly worked through and rendered of even quality before it is removed from the box.

In order to render the present specification easily intelligible, reference is had to the accompanying drawings, in which similar letters of reference denote similar parts throughout the several views.

Figure 1:
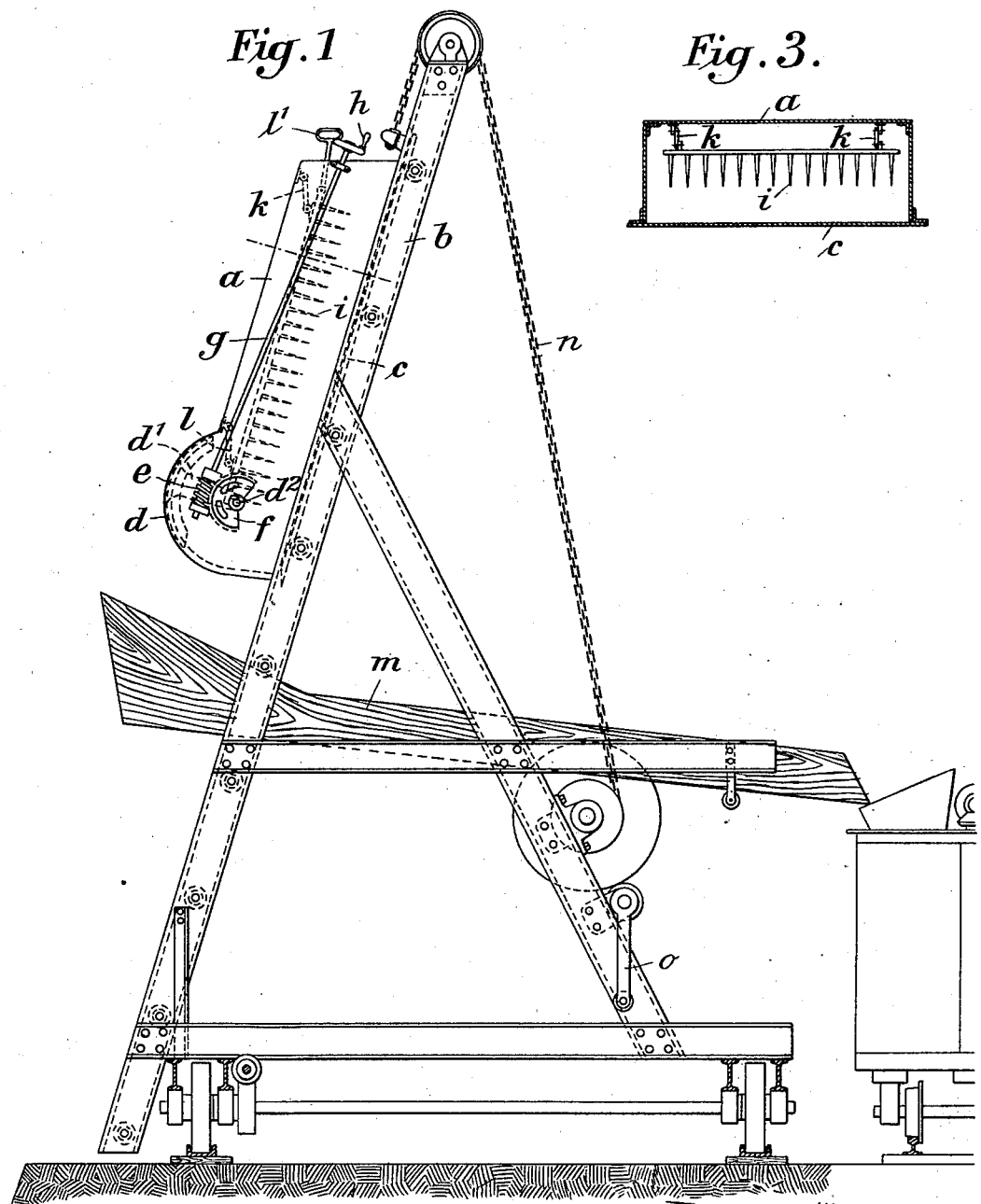
Figure 2:
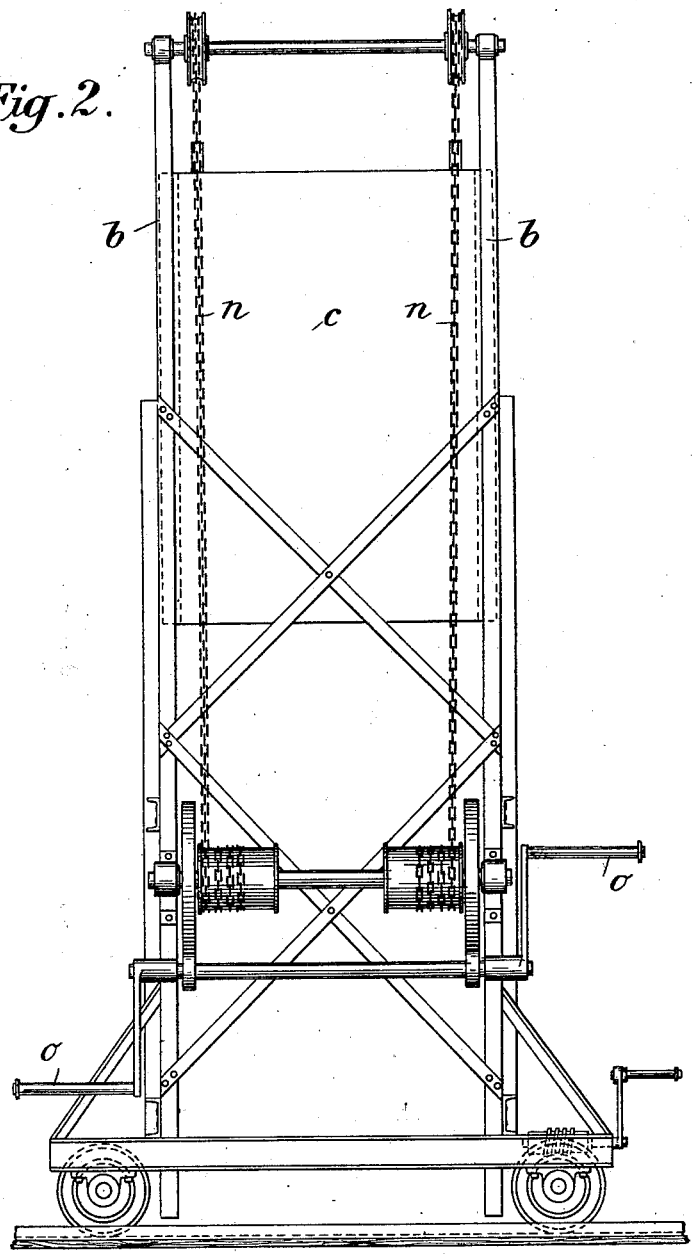

Figure 1 is a side elevation of the apparatus; Fig. 2, a rear elevation, and Fig. 3 a cross-section through the box.

The frame $b$ is advantageously mounted on wheels and adapted to run on rails laid along the part of the pit to be cut. The said frame forms an approximately vertical guideway for the box $a$, the rear wall of which, $c$, is formed to a cutter at its lower edge, as will be readily understood on reference to Fig. 1. The lower outer wall of the box is formed round to receive a curved slide $d$, which may be turned down to close the bottom of the box. The slide $d$ is attached by arms $d'$ to a spindle $d^2$, said spindle being provided with a tooth-segment $f$, engaging a worm-wheel $e$, mounted on a rod $g$, leading to the top of the box, and provided there with a hand-wheel $h$, by means of which the slide may be turned to close the bottom of the box after the turf has been cut.

Any suitable mixing device may be provided within the box, and a rake device having teeth $i$ is illustrated for the purposes of the present specification. This rake $i$ is hung on the inside of the front box-wall by means of arms $k$ and $l$, a handle $l'$ extending out of the box at the top, by means of which the mixing device may be moved up and down and to and from the turf in the box.

The box is hung on chains $n$, which may be wound up by any suitable device and operated to raise or lower the said box by means of the handles $o$.

The device is manipulated in the following manner: The box is allowed to fall of its own weight into the cutting, whereby the cutter edge of the wall $c$ will cut off a layer of turf, which passes into the box. The layer cut off is advantageously not thick enough to contact with the points of the rake when the latter is in its rearward position, and the length of the box is advantageously calculated to pierce through the depth of the turf-layer being cut. If the weight of the box is not sufficient to cut the turf properly, the said box may of course be loaded down to the proper amount. After the layer of turf has been cut off the hand-wheel $h$ is turned to close down the slide $d$ and the mixing device is thoroughly worked by means of the handle $l'$.
The box is then raised and a chute $m$ is advantageously projected underneath the same by suitable means. (Not shown.) The slide is then opened and the turf falls down onto the chute, whence it is passed direct to the trucks or otherwise removed.

I claim as my invention—

1. In a turf-cutting device, the combination of a box having its rear lower side edge formed to a cutter, a guide for the said box and means for raising and lowering the same, a movable slide to close the bottom of the said box and means therein for mixing the turf after it has been cut substantially as described.

2. In a turf-cutting device the combination of a substantially vertically reciprocatory box having the lower edge of its rear side formed to a cutter, a rounded enlargement at the lower end of the front wall, a curved slide therein a rotary shaft and arms to connect to the same the said slide, worm-gearing to operate said shaft to open and close the lower end of the box, and a mixing device within the said box substantially as described.

3. In a turf-cutting device the combination of an approximately vertically reciprocatory box having a cutter edge formed at its lower rear wall edge, a slide to close the bottom of the said box when the turf has been cut, a rake mounted within the box, arms to connect the said rake to the inside of the front wall of the box and means for swinging the said rake on its arms from the exterior of the box substantially as described.

In witness whereof I have hereunto set my hand in presence of two witnesses.

WLADISLAUS GALECKI.

Witnesses:
HENRY HASPER,
WOLDEMAR HAUPT.